United States Patent [19]

Nixon et al.

[11] Patent Number: 4,548,564
[45] Date of Patent: Oct. 22, 1985

[54] SELF-ALIGNMENT APPARATUS FOR MOLDS OF A TIRE VULCANIZING PRESS

[75] Inventors: Bryan E. Nixon; Larry E. Steidl, both of Akron, Ohio; Itaru Amano, Kobe, Japan; Yasuhiko Fujieda, Hyogo, Japan; Hisaaki Onishi; Hideo Miyauchi, both of Kobe, Japan

[73] Assignee: The Goodyear Tire & Rubber Company, Akron, Ohio

[21] Appl. No.: 644,298

[22] Filed: Aug. 27, 1984

[30] Foreign Application Priority Data

Sep. 13, 1983 [JP] Japan .................................. 58-169937

[51] Int. Cl.⁴ .............................................. B29H 5/02
[52] U.S. Cl. ....................................... 425/32; 425/138
[58] Field of Search ..................... 425/17, 19, 20, 21, 425/22, 23, 24, 25, 32, 33, 34, 35, 36, 37, 39, 40, 46, 138

[56] References Cited

U.S. PATENT DOCUMENTS

| 3,029,469 | 4/1962 | Moore et al. | 425/33 |
| 3,298,066 | 1/1967 | Soderquist | 425/32 |
| 3,530,533 | 9/1970 | Turk et al. | 425/32 |
| 3,584,335 | 6/1971 | Ulm et al. | 425/36 |
| 4,013,389 | 3/1977 | MacMillan | 425/23 X |
| 4,144,006 | 3/1979 | Iuchi | 425/33 |
| 4,184,823 | 1/1980 | Williams | 425/33 X |
| 4,221,124 | 9/1980 | Jones | 425/33 X |
| 4,239,723 | 12/1980 | Williams | 425/36 |

Primary Examiner—J. Howard Flint, Jr.
Attorney, Agent, or Firm—T. P. Lewandowski

[57] ABSTRACT

A tire press has a feature decoupling the mold closing force torque from the platens 3 and 22 supporting the press mold halves 4 and 11 using a spherical seat located between the platens 3 and 22 and the press member supplying the closing force to provide self-alignment of the mold halves 4 and 11 upon closing of the press.

5 Claims, 5 Drawing Figures

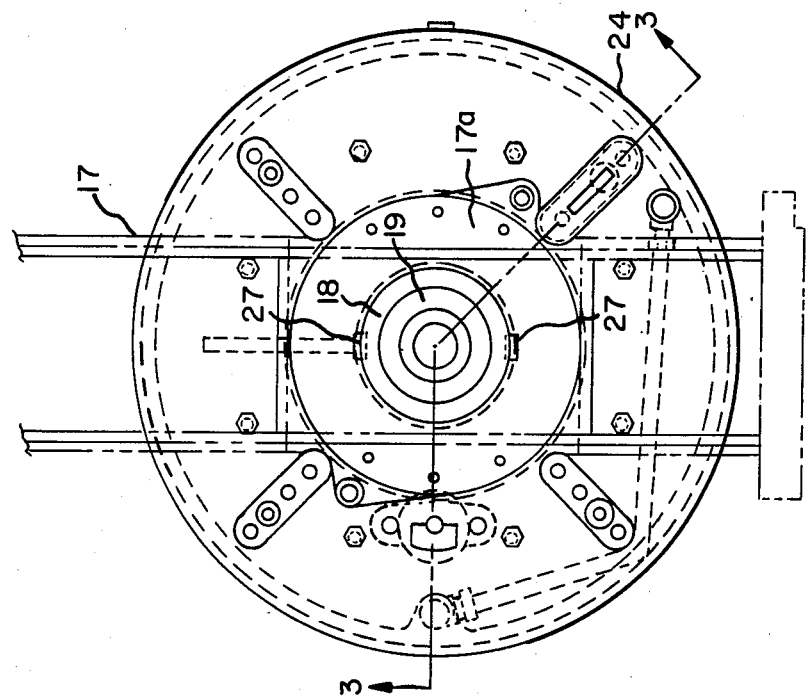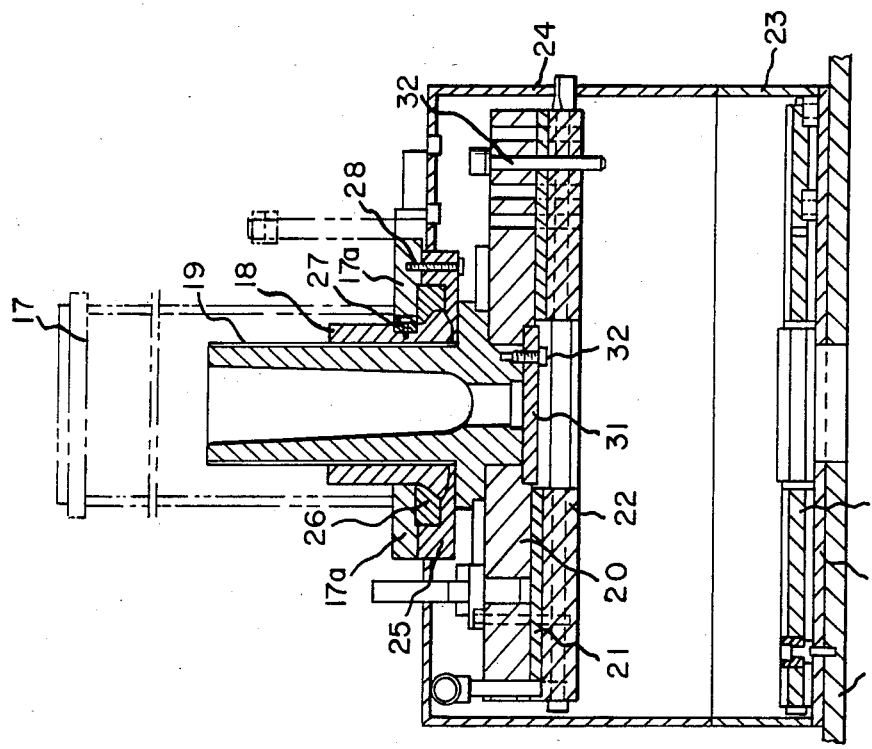

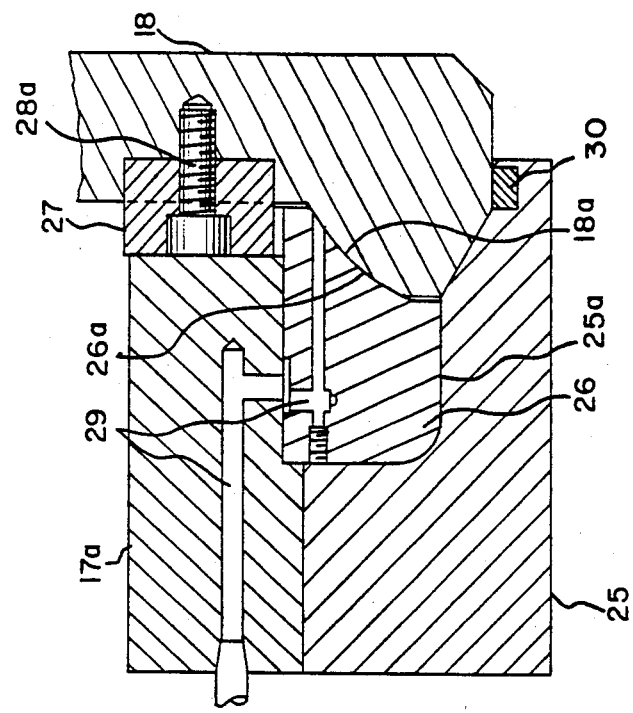
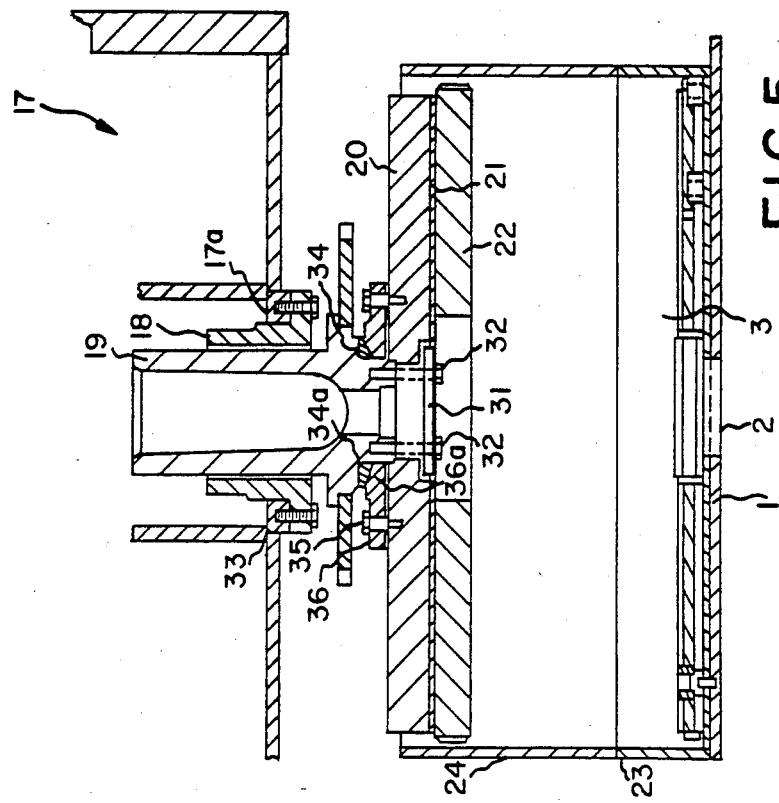

SELF-ALIGNMENT APPARATUS FOR MOLDS OF A TIRE VULCANIZING PRESS

A serious problem in conventional tire vulcanizing presses of the type which are arranged to apply the closing pressure to upper and lower mold halves supported on upper and lower platens of the press is misalignment of the centers of the molds. When the press is set in place the platens are adjusted into parallelism so that properly placed mold halves will be concentrically located when the press is closed. However, in operation due to the forces generated by the press, deflections in the super structure of the press can be transmitted to the platens taking them out of parallelism and further wear of the press over an appreciable period of time can result in the platens being misaligned. As a result when the press closes the mold halves do not meet in a concentric manner.

The apparatus of the present invention overcomes the above problem by maintaining the parallelism of the upper and lower platens for uniform application of a closing force on the upper and lower molds to prevent misalignment of the centers of the mold halves. The present apparatus has the ability to absorb deflection and correct misalignment in an effective and reliable manner with the added advantage of a great degree of freedom with regard to location of the particular feature giving the absorption and alignment capability. These features can be incorporated into a conventional press or provided on a new press. Another advantage is that the features require components of a simple structure resulting in little or no change in the structure of the conventional press itself to accept the new feature. In addition to the advantages above and the reliability in operation the simplicity of construction of the new features reduces the possibility of causing further problems in the press structure and does not require an increase in size or complication of the press structure for its introduction.

The present invention is directed at a tire vulcanizing press and more particularly at a decoupling and self-aligning feature of the press. Such features exist in a tire vulcanizing press having upper and lower mold halves movably supported on upper and lower platens for movement toward and away from each other and located between a vertically movable top link and a fixed base; the press includes means for decoupling of the platens from the press structure applying the closing force to permit self-aligning of the mold halves into concentric arrangement upon closing of the press wherein the means for allowing decoupling and self-aligning are located between the platens and the press. Further said means for decoupling and self-aligning include two contacting surfaces one of which is a spherical surface. The other contacting surface can be a tapered surface. Both surfaces may be located between a top link and the top platen.

The above advantages of the invention will become readily apparent to one skilled in the art from reading the following detailed inscription of an embodiment of the invention when considered in light of the accompanying drawings, in which FIG. 1 is an elevational view of a press with portions thereof in cross-section incorporating an embodiment of the present invention;

FIG. 2 is a plan view of the upper mold and associated component parts;

FIG. 3 is a cross-sectional view along line 3—3 of FIG. 2;

FIG. 4 is an enlarged cross-sectional view showing details of the spherical seat in FIG. 1;

FIG. 5 is a cross-sectional view of another embodiment of the invention.

Figure 1:
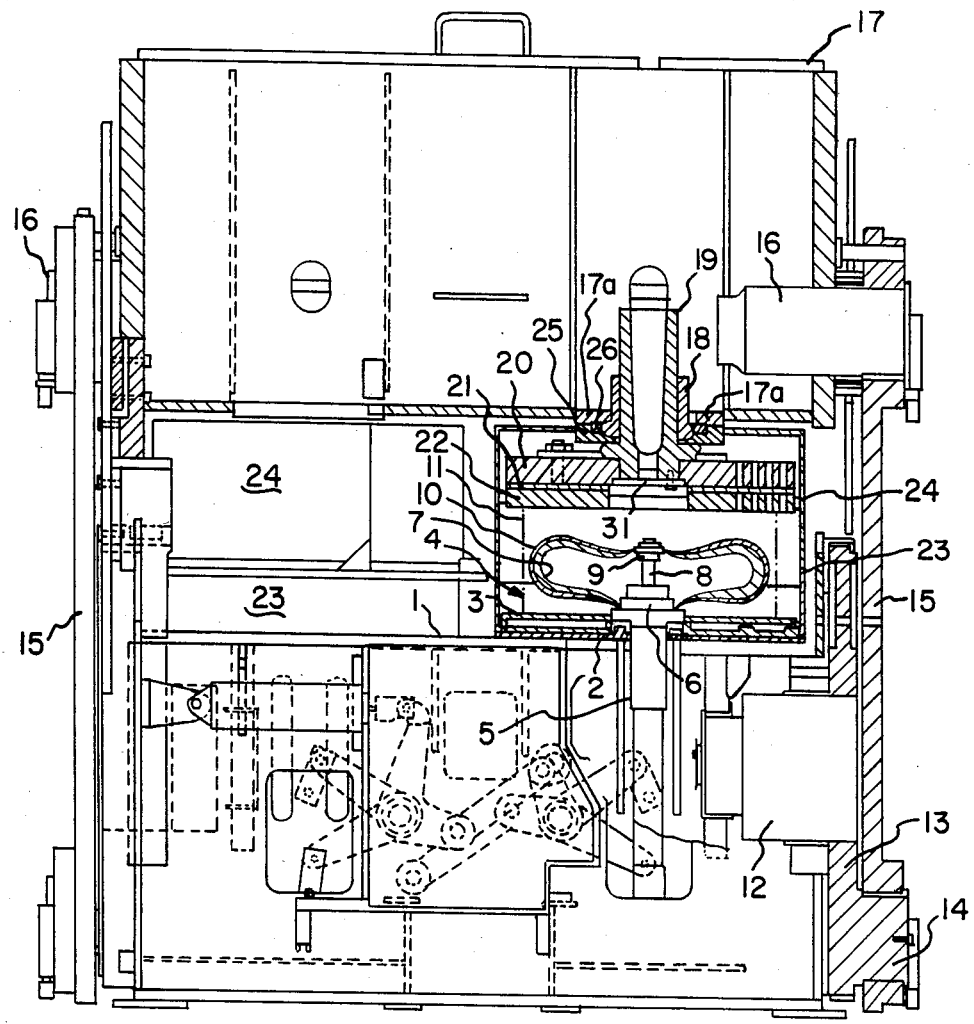

Referring to the drawings, FIG. 1 illustrates an embodiment incorporating apparatus of the present invention into a conventional dual mold clamp type multiple tire vulcanizing press. The construction of the vulcanizing press itself is conventional and its major components are shown schematically which include a bottom platen 3 mounted on a fixed base 1 through a heat insulator 2. A lower vulcanizing mold 4 illustrated in phantom is mounted on the bottom platen 3 which is internally supplied with a heating fluid such as steam, hot gas or the like or provided with a heat source such as a heater. A centering mechanism 5 is vertically and moveably inserted through the base 1 at the center of the lower mold 4 or at the center of the press. The centering mechanism 5 has a lower ring 6 for holding the end of the bladder 7 serving as an expansible resilient shaping member in a conventional manner. The upper end of the bladder 7 is retained on the upper end of a vertically moveable piston rod 8 of the centering mechanism 7 through an upper ring 9. The bladder 7 is fitted on the inner surface of an uncured tire 10 by the piston rod 8 to shape the interior surface of the tire. For this purpose steam or some other heat source is fed into the bladder 7 through the centering mechanism 5. The upper vulcanizing mold 11 which is moveable toward and away from the fixed lower mold 4 is located on a top link 17 which itself is supported at the upper end of a slide link 15 through a pin shaft 16, the slide link 15 being pivotally supported at its lower end through a pin shaft 14 in an eccentric position on a crank gear 13 of a crank shaft 12 which is pivotally supported on the base 1 in the particular example illustrated. More particularly, a top platen support 20 is mounted on a mold height adjusting screw shaft 19 which is threaded into an internally threaded mold height adjusting cylinder 18 fixedly mounted in the lower portion 17a of the top link 17. The upper mold 11 is attached to the under side of a top platen 22 which is fixedly mounted on the support 20 through a heat insulator 21. In the same figure, reference numerals 23 and 24 indicate top and bottom shields which enclose the circumferences of the lower and upper mold halves 4 and 11, respectively, forming what is called a press cavity, which shields are moveable with the molds 4 and 11.

In the particular example shown, the press is provided with another set of upper and lower molds (not illustrated) which are supported in a similar manner on the left side of the press illustrated in FIG. 1 wherein only a bottom shield 23 and top shield 24 are illustrated. The top link 17 is common to the two sets of molds. Further, the top link 17 is provided with the crank press mechanism including the side link 15 at each end thereof as shown in FIG. 1. In the example illustrated, when the closing pressure on the upper and lower molds 4 and 11 is applied by the top link 17 to the mold closing and fastening mechanisms constituted by the side link 15, crank shaft 12, etc., there occurs deflection on the part of the top link 17 due to the large closing force as previously mentioned, deforming the top link 17 into an arcuate form with its opposite ends flexed downwardly as compared with its center portion if they were illustrated in a somewhat exaggerated manner.

At the same time, an inverse deflection occurs to the base 1 i.e. the base 1 is deformed into an arcuate form with its opposite ends flexed upwardly as compared with its center portion. Consequently, the parallelism of the top and bottom platens 22 and 3 which support the upper and lower mold halves 4 and 11 is to a considerable degree lost.

According to the present invention, in order to maintain the parallelism of the top and bottom platens 22 and 3 a spherical seat is introduced in the form of a holder 25 and a plate 26 around the circumference of the lower portion of the height adjusting cylinder 18 which is provided the bottom of the top link 17 and between the top link 17 and top platen 22 in the particular embodiment shown in FIG. 1.

Referring to FIGS. 2 through 4 of the drawings the height adjusting cylinder 18 is keyed in a key way which is provided in the top link lower portion or plate 17a using parallel keys 27 which are diametrically opposed on the outer periphery of the internally threaded cylinder 18 to prevent rotation of the cylinder 18 with respect to the plate 17a. In order to prevent dislocation of the internally threaded cylinder 18 in the axial direction, its lower end is supported on the inner peripheral edge of a ring like holder 25 which is fixed to the underside of the lower plate 17a by bolts 28 or other fastening means. A similar ring like plate 26 is supported between a stepped portion 25a on the upper side of the holder 25 and the under side of the lower plate 17a, the plate 26 having on its inner periphery a tapered surface 26a in contact with the outer periphery of the internally threaded cylinder 18 which has a spherical surface 18a in the particular embodiment shown to thereby provide a spherical seat. The holder 25 and plate 26 are both in the form of rings which are disposed concentrically with the press center, while the spherical surface 18a consists of a surface of a suitable radius of curvature which is also disposed concentrically with the press center. The same result can be obtained from an arrangement which uses the tapered surface 26a and the spherical surface 18a in an inverted relationship, namely an arrangement in which the plate 26 is provided with a spherical surface instead of the tapered surface 26a and the internally threaded cylinder 18 is provided with a tapered surface in place of the spherical surface 18a. Further, the two engaging surfaces may be spherical surfaces having the same or different radius of curvature. The present invention encompasses all of the above alternatives.

FIG. 4 illustrates a mounting screw 28a for the parallel key 27 and a passage 29 formed in the lower plate 17a as well as plate 26 for applying grease or other lubricant such as oil to the spherical seat. An O-ring 30 is fitted in the inner periphery at the inner end of the holder 25 to retain the lubricant. The adjusting screw rod 19 previously mentioned as vertically moveably threaded into the adjusting cylinder 18 retains the platen support 20 in position by a mounting ring 31 which is fixed on the lower end of the screw rod 19. The top platen 22 is attached integrally to the lower side of the support 20 through a heat insulator 21 by bolts 32.

The location of the spherical seat is not limited to the mold height adjusting cylinder 18 as shown in FIGS. 1 through 4. One alternative would be to provide the spherical seat between the top link 17 and top platen 22 as illustrated in the embodiment shown in FIG. 5. In this case, the mold height adjusting cylinder 18 is fixed to the lower plate 17a of the top link 17 by bolts 33 or other suitable fastening means. A ring-like plate 34 with a spherical surface 34a is fitted on the lower portion of a mold height adjusting screw rod 19 which is vertically moveably threaded into the cylinder 18 for engagement with an opposing spherical surface 36a of a similar ring-like holder 36 which is fixed by bolts 35 or other suitable fastening means on the upper side of the platen support 20. The platen support 20 is in turn retained in position at the lower end of the screw shaft 19 by a mounting ring 31 thereby forming a spherical seat. In a manner similar to the embodiment shown in the figures the same effects are obtainable no matter whether the spherical surfaces 34a and 36a have the same or different radius of curvature or alternately either of the spherical surfaces 34a or 36a can be replaced by a tapered surface permitting a greater freedom in design. In FIG. 5 those component parts which are common to FIGS. 1 to 4 are designated by similar reference numerals.

The present invention is not limited to the synchronized dual mold clamp type press as illustrated in the particular embodiments shown, and is applicable to a single type tire vulcanizing press as well. Further, the mechanism which is employed in the illustrated embodiment as means for vertically moving the top link 17 may be replaced, for example, by a hydraulic cylinder mechanism mounted at the center of a frame and supporting the top link 17 vertically moveably by its piston rod. Thus, the present invention can be applied in the manner disclosed irrespective of the particular arrangement which is employed as means for vertically moving the top link.

According to the present invention, a spherical seat is interposed between the top platen 22 which directly supports the upper mold half 11 and the top link 17 which vertically moves the top platen 22. The spherical seat is formed by two engaging surfaces at least one of which is in the form of a spherical surface and the other in the form of a spherical or tapered surface. The parallelism of the upper and lower platens 22 and 3 is maintained by the spherical seat decoupling torque which would otherwise be applied through the adjusting cylinder 18 upon deflection of the top link 17 to produce an automatic centering or alignment on the upper and lower mold halves 4 and 11 in a reliable manner. Namely, in the particular embodiment shown in FIG. 4, the height adjusting cylinder 18 is formed with a spherical surface 18a for contact with a tapered surface 26a on the plate 26. Therefore, when the molds are clamped in a closed state by closing the upper mold half 11 on the lower mold half 4 through the lowering of the top link 17 and simultaneous application of the closing force on the upper and lower mold halves 11 and 4 which are gripped between the top and bottom platens 22 and 3 by the operation of the crank mechanism including the crank shaft 16, the irregularities in the fastening force which are caused by the deflection of the top link 17 as mentioned hereinbefore are accommodated by the spherical surface in such a manner as to absorb the deflection of the top link 17 and not pass any displacement onto the platens 3 and 22, thereby making it possible to maintain the parallelism between the top platen 22 and the bottom platen 3 constant. This can be proved by the fact that the top platen 22 is subject to a torque when irregularities occur in the closing forced acting upon various portions of the top platen due to deflection of the top link 17. The procedures for calculating such torque are known and therefore not included herein.

In accordance with the provisions of the patent statutes, the principal and mode of operation of the device have been explained and what is considered to represent its best embodiment have been illustrated and described. It should, however, be understood that the invention may be practiced otherwise than as specifically illustrated and described without departing from its spirit or scope.

I claim:

1. In a tire vulcanizing press having upper and lower mold halves moveably supported on upper and lower platens for movement toward and away from each other and located between a vertically moveable top link and a fixed base, means for decoupling of the platens from torque applied by the press structure applying the closing force to the mold halves providing for arcuate movement of the platens for self-aligning of the mold halves into concentric arrangement upon closing of the press, the means for allowing decoupling and self-aligning being located between the platens and the press.

2. The apparatus defined in claim 1 wherein said means for decoupling and self-aligning includes two contacting surfaces, one being a spherical surface.

3. The apparatus defined in claims 1 or 2 wherein said means for decoupling and self-aligning is located between the top link and the top platen.

4. The apparatus defined in claims 1 or 2 wherein said means for decoupling and self-aligning includes a tapered surface.

5. The apparatus defined in claim 4 wherein said means for decoupling and self-aligning is located between the top link and the top platen.

* * * * *

UNITED STATES PATENT AND TRADEMARK OFFICE
CERTIFICATE OF CORRECTION

PATENT NO. : 4,548,564
DATED : 10/22/85
INVENTOR(S) : Bryan E Nixon, Larry E Steidl, Itaru Amano,
Yasuhiko Fujieda, Hisaki Onishia & Hideoi Miyauchi It is certified that error appears in the above-identified patent and that said Letters Patent is hereby corrected as shown below:

ON THE TITLE PAGE AT -

"[73] Assignee:  The Goodyear Tire & Rubber Company, Akron, Ohio"

ADD THE FOLLOWING:

--, and Kabushiki Kaisha Kobe Seiko Sho aka Kobe Steel, Ltd., Kobe, Japan--

Signed and Sealed this

Eleventh Day of February 1986

[SEAL]

Attest:

DONALD J. QUIGG

Attesting Officer

Commissioner of Patents and Trademarks